US011372419B1

(12) United States Patent
Huang

(10) Patent No.: US 11,372,419 B1
(45) Date of Patent: Jun. 28, 2022

(54) METHOD FOR SHORTENING WAITING TIME FOR HUMAN-ROBOT INTERACTION, DEVICE AND STORAGE MEDIUM

(71) Applicant: SYRIUS ROBOTICS CO., LTD., Shenzhen (CN)

(72) Inventor: Hua Huang, Shenzhen (CN)

(73) Assignee: SYRIUS ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 17/555,536

(22) Filed: Dec. 20, 2021

(30) Foreign Application Priority Data

Dec. 23, 2020 (CN) .......................... 202011537863.4

(51) Int. Cl.
*B25J 9/16* (2006.01)
*G05D 1/02* (2020.01)

(52) U.S. Cl.
CPC ......... *G05D 1/0217* (2013.01); *G05D 1/0276* (2013.01); *G05D 2201/0216* (2013.01)

(58) Field of Classification Search
CPC ........ B25J 11/0005; B25J 11/001; B25J 9/16; G05B 2219/40202; G05B 2219/32353; G05B 2219/32266; G05B 19/41865; G05B 19/41835
USPC ................... 700/250, 102, 173, 86; 715/751
See application file for complete search history.

(56) References Cited

U.S. PATENT DOCUMENTS

| 7,626,569 | B2* | 12/2009 | Lanier | G06F 3/012 |
| | | | | 348/42 |
| 10,645,225 | B1* | 5/2020 | Stoops | H04M 7/0045 |
| 2007/0087756 | A1* | 4/2007 | Hoffberg | G06Q 20/065 |
| | | | | 455/450 |
| 2009/0112343 | A1* | 4/2009 | Yuan | G05B 19/41865 |
| | | | | 700/115 |
| 2018/0133900 | A1* | 5/2018 | Breazeal | B25J 19/026 |

FOREIGN PATENT DOCUMENTS

| CN | 107516142 A | 12/2017 |
| CN | 107703891 A | 2/2018 |
| CN | 107992053 A | 5/2018 |
| CN | 109291058 A | 2/2019 |
| CN | 109447539 A | 3/2019 |
| CN | 111738475 A | 10/2020 |
| CN | 111950818 A | 11/2020 |

* cited by examiner

*Primary Examiner* — Dalena Tran
(74) *Attorney, Agent, or Firm* — Gang Yu

(57) ABSTRACT

A method for shortening a waiting time for human-robot interaction, a device and a storage medium are provided. A robot acquires a to-be-executed task, plans an optimal navigation path according to a task location of the to-be-executed task, and goes to a first location according to the planned optimal navigation path to execute a task corresponding to the first location. The robot determines whether there is a worker, capable of performing human-robot cooperation, at the first location. In a case where there is a worker, capable of performing human-robot cooperation, at the first location, the robot sends prompt information and waits, at the first location, for the worker to cooperatively complete the task corresponding to the first location. In a case where there is no worker, capable of performing human-robot cooperation, at the first location, the robot goes to a next location according to the optimal navigation path.

20 Claims, 3 Drawing Sheets

METHOD FOR SHORTENING WAITING TIME FOR HUMAN-ROBOT INTERACTION, DEVICE AND STORAGE MEDIUM

CROSS REFERENCE

This application claims priority to Chinese Application No. 202011537863.4, filed to the China National Intellectual Property Administration on Dec. 23, 2020 and entitled "Method for Shortening Waiting Time for Human-Robot Interaction, Device and Storage Medium", the content of which is hereby incorporated by reference in its entirety.

TECHNICAL FIELD

The present disclosure relates to the technical field of robots, and in particular, to a method for shortening a waiting time for human-robot interaction, a device and a storage medium.

BACKGROUND

As the number and usage frequency of intelligent robots in the warehouse increase, generally, a large number of robots and workers may simultaneously exist in one warehouse. In the current storage industry, most of the work requires to be completed with the cooperation of the robots and the workers. When the robots cannot effectively cooperate with the workers, a large number of robots need to wait for the workers to assist in completing tasks, resulting in reduction of operation efficiency of the warehouse.

Related art mainly focuses on planning a better path or an optimal navigation route for the robots, for example, according to current task details and specific locations where commodities in the warehouse are located, an optimal path of robot operation is planned, so as to control the robots to move according to the navigation path to complete the tasks. However, in this process, if a robot reaches a designated location, but there is no worker nearby to assist in completing a task, the robot needs to wait until a worker cooperates with the robot to complete the current task. Such a way of making the robot wait in place for the worker to complete the task wastes a lot of working hours and reduces the overall working efficiency of human-robot interaction.

SUMMARY

Embodiments of the disclosure provide a method for shortening a waiting time for human-robot interaction, a device and a storage medium, which can shorten the waiting time for human-robot interaction and enhance working efficiency of human-robot interaction.

According to a first aspect of the embodiments of the present disclosure, a method for shortening a waiting time for human-robot interaction is provided. The method includes the following operations.

A robot acquires a to-be-executed task, plans an optimal navigation path according to a task location of the to-be-executed task, and goes to a first location according to the planned optimal navigation path to execute a task corresponding to the first location.

The robot determines whether there is a worker, capable of performing human-robot cooperation, at the first location.

In a case where there is a worker, capable of performing human-robot cooperation, at the first location, the robot sends prompt information and waits, at the first location, for the worker to cooperatively complete the task corresponding to the first location.

In a case where there is no worker, capable of performing human-robot cooperation, at the first location, the robot goes to a next location according to the optimal navigation path.

According to a second aspect of the embodiments of the present disclosure, a robot is provided. The robot includes a navigation module, a determination module, and an execution module.

The navigation module is configured to acquire a to-be-executed task, plan an optimal navigation path according to a task location of the to-be-executed task, and go to a first location according to the planned optimal navigation path to execute a task corresponding to the first location.

The determination module is configured to determine whether there is a worker, capable of performing human-robot cooperation, at the first location.

The execution module is configured to:
in a case where there is a worker, capable of performing human-robot cooperation, at the first location, send prompt information and wait, at the first location, for the worker to cooperatively complete the task corresponding to the first location; and in a case where there is no worker, capable of performing human-robot cooperation, at the first location, go to a next location according to the optimal navigation path.

According to a third aspect of the embodiments of the present disclosure, an electronic device is provided. The electronic device includes a memory and a processor. The memory stores a waiting reduction program capable of being operated on the processor. When the waiting reduction program is operated by the processor, the method for shortening a waiting time for human-robot interaction is executed.

According to a fourth aspect of the embodiments of the present disclosure, a computer-readable storage medium is provided. The storage medium stores a waiting reduction program thereon. The waiting reduction program is executed by one or more processors to implement operations of the method for shortening a waiting time for human-robot interaction.

According to the method for shortening a waiting time for human-robot interaction, the device and the storage medium in the embodiments of the present disclosure, a robot acquires a to-be-executed task, plans an optimal navigation path according to a task location of the to-be-executed task, and goes to a first location according to the planned optimal navigation path to execute a task corresponding to the first location. The robot determines whether there is a worker, capable of performing human-robot cooperation, at the first location. In a case where there is a worker, capable of performing human-robot cooperation, at the first location, the robot sends prompt information and waits, at the first location, for the worker to cooperatively complete the task corresponding to the first location. In a case where there is no worker, capable of performing human-robot cooperation, at the first location, the robot goes to a next location according to the optimal navigation path. Therefore, the waiting time of human-robot interaction between the worker and the robot is shortened, and the working efficiency of human-robot interaction is effectively enhanced.

BRIEF DESCRIPTION OF THE DRAWINGS

The accompanying drawings are used to provide a further understanding of the present disclosure, and constitute a part of the specification, which are used to explain the present disclosure with the embodiments of the present disclosure, and do not constitute a limitation of the present disclosure.

In the drawings.

DETAILED DESCRIPTION OF THE EMBODIMENTS

The exemplary embodiments of the present disclosure will be described below with reference to the accompanying drawings. It should be understood that the exemplary embodiments described here are merely used to illustrate and explain the present disclosure, and are not used to limit the present disclosure.

The embodiments of the present disclosure provide a method for shortening a waiting time for human-robot interaction, a device and a storage medium. The technical solution is mainly applicable for human-robot interaction waiting when a plurality of workers cooperates with a plurality of robots in a work scenario that requires human-robot cooperation. For the robots with human-robot interaction and cooperation, based on an optimal path acquired by the robots, factors of the workers are fully considered. By effectively combining the optimal path and the workers, a purpose of reducing the waiting time for human-robot interaction between the workers and the robots is achieved, thereby effectively improving the working efficiency of human-robot interaction.

Figure 1:
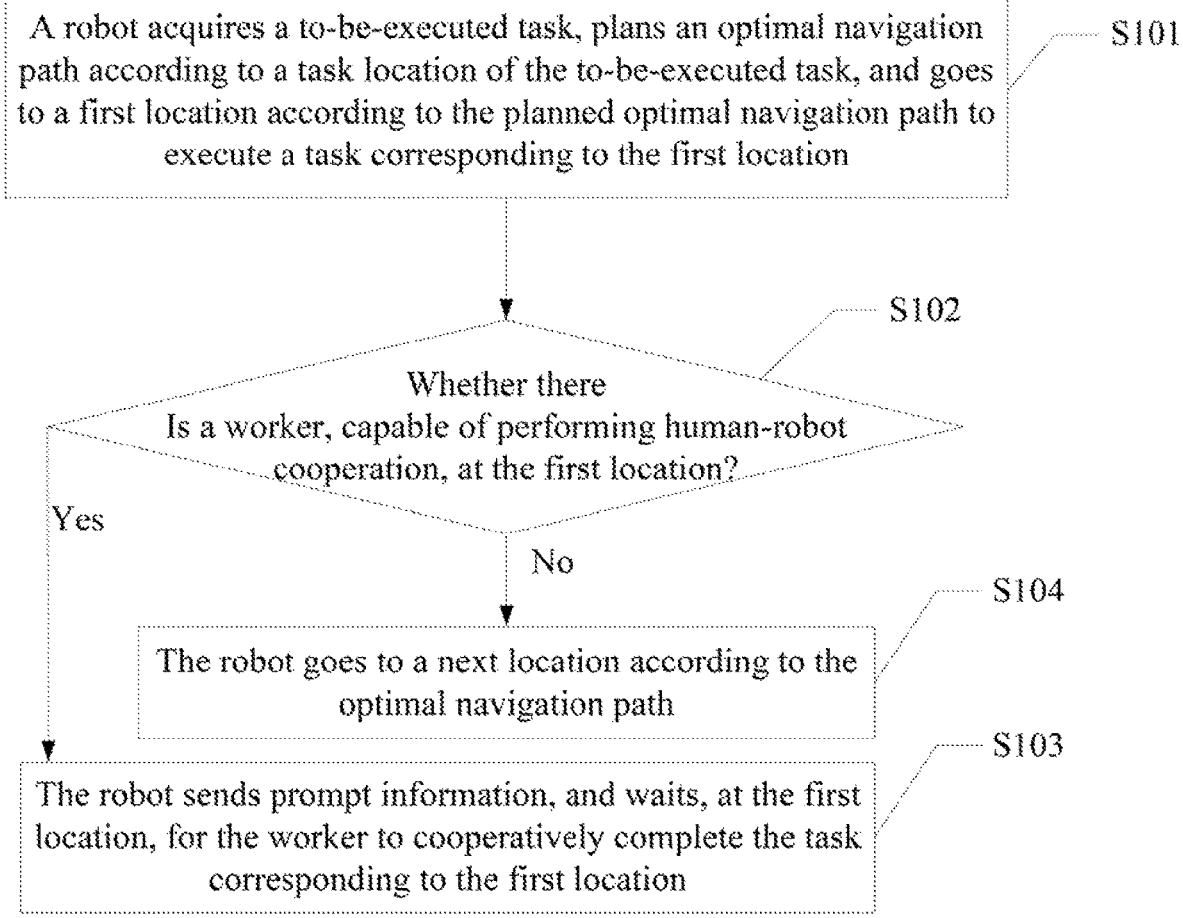
FIG. 1 is a schematic flowchart of an implementation of a method for shortening a waiting time for human-robot interaction according to the present disclosure.

As shown in FIG. 1, which is a schematic flowchart of an implementation of a method for shortening a waiting time for human-robot interaction according to the present disclosure, the method for shortening a waiting time for human-robot interaction in the embodiments of the present disclosure can be implemented as operations S101 to S104 as described below.

At operation S101, A robot acquires a to-be-executed task, plans an optimal navigation path according to a task location of the to-be-executed task, and goes to a first location according to the planned optimal navigation path to execute a task corresponding to the first location.

In the embodiments of the present disclosure, the robot acquires a to-be-executed task. According to a task execution location corresponding to the to-be-executed task, the optimal navigation path is planned for the robot by combining locations at which workers are located in a work scenario. Therefore, the robot goes to the corresponding location according to the planned optimal navigation path to execute a task corresponding to this location.

For example, in an exemplary application scenario, a picking order that the robot needs to execute includes three commodities A, B and C in total, and the robot is required to complete a picking task. The optimal navigation path planned for the robot according to locations in the current warehouse is to go to a location P1 to pick the commodity A, then go to a location P2 to pick the commodity B, and finally go to a location P3 to pick the commodity C.

At operation S102, the robot determines whether there is a worker, capable of performing human-robot cooperation, at the first location.

In a case where there is a worker, capable of performing human-robot cooperation, at the first location, operation S103 is executed. In a case where there is no worker, capable of performing human-robot cooperation, at the first location, operation S104 is executed.

At operation S103, the robot sends prompt information, and waits, at the first location, for the worker to cooperatively complete the task corresponding to the first location.

At operation S104, the robot goes to a next location according to the optimal navigation path.

In the embodiments of the present disclosure, in order to shorten meaningless waiting of the robot due to the absent of the cooperative worker at the corresponding location, when the robot reaches the first location, the robot determines whether there is a worker, capable of performing human-robot cooperation, at the first location. When whether there is a corresponding worker at the first location is determined, a preset interaction radius range corresponding to the first location is taken as a determination basis.

In a case where there is a worker, capable of performing human-robot cooperation, in the preset interaction radius range corresponding to the first location, a determination result that there is a worker, capable of performing human-robot cooperation, at the first location can be acquired. Likewise, in a case where there is no worker, capable of performing human-robot cooperation, in the preset interaction radius range corresponding to the first location, a determination result that there is no worker, capable of performing human-robot cooperation, at the first location can be acquired.

In a case where it is determined that there is a worker, capable of performing human-robot cooperation, at the first location, the robot sends prompt information to prompt the worker that the current task can be completed through cooperation. Meanwhile, the robot waits, at the first location, for the worker to cooperatively complete the task corresponding to the first location.

In a case where it is determined that there is no worker, capable of performing human-robot cooperation, at the first location, the robot directly goes to the next location according to the optimal navigation path.

Further, in the embodiments, in a case where it is determined that there is no worker, capable of performing human-robot cooperation, at the first location, the robot may briefly stay for a preset time duration (for example, one minute or two minutes). Within the preset time duration for which the robot briefly stays, in a case where there is no cooperative worker responding to the waiting of the robot, the robot leaves directly to shorten meaningless waiting. According to the optimal navigation path, the robot directly goes to the next location corresponding to the optimal navigation path.

Further, in the embodiments, in operation S102 of the embodiment shown in FIG. 1, the robot determines whether there is a worker, capable of performing human-robot cooperation, at the first location, and a main determination basis for this operation is location information of the worker. Therefore, when the robot determines whether there is a worker, capable of performing human-robot cooperation, at the first location, the corresponding location information of the worker needs to be acquired. Since the worker is an active natural person, the location of the worker may vary all the time. Therefore, there are mainly two methods for acquiring worker location information. One acquisition method is to estimate the location of the worker according to the location of human-robot interaction that has occurred. This acquisition method for acquiring the worker location information does not need to extra increase any hardware costs. Another acquisition method is that the worker wears a corresponding Personal Digital Assistant (PDA) or mobile phone and other positioning terminals having positioning functions. The location of the worker acquired by this method for acquiring the worker location information will be more accurate.

Based on the above descriptions, in some exemplary embodiments, the operation S102 that the robot determines whether there is a worker, capable of performing human-robot cooperation, at the first location of the embodiment shown in FIG. 1 may be implemented according to the following technical means.

The robot receives human-robot interaction record information broadcast by a server in real time; and the robot determines whether there is a worker, capable of performing human-robot cooperation, at the first location according to the human-robot interaction record information.

Further, the operation of determining whether there is a worker, capable of performing human-robot cooperation, at the first location according to the human-robot interaction record information may be implemented according to the following technical means.

According to the human-robot interaction record information, whether a human-robot interaction record exists is acquired in a past preset time duration within a preset interaction radius range corresponding to the first location; in a case where the human-robot interaction record exists, it is determined that there is a worker, capable of performing human-robot cooperation, at the first location; and in a case where the human-robot interaction record does not exist, it is determined that there is no worker, capable of performing human-robot cooperation, at the first location. The human-robot interaction record information includes record information corresponding to human-robot interaction occurring at a location coordinate (x, y) within a time period T.

In another embodiment, the operation S102 that the robot determines whether there is a worker, capable of performing human-robot cooperation, at the first location of the embodiment shown in FIG. 1 may be implemented according to the following technical means.

The robot receives worker location information broadcast by the server in real time; and whether there is a worker, capable of performing human-robot cooperation, within a preset radius range corresponding to the first location is determined according to the received worker location information. The worker performing human-robot cooperation wears the positioning terminal, and the positioning terminal interacts with the server in real time and sends corresponding location information of the worker to the server. The positioning terminal includes, but is not limited to, a PDA, a mobile phone and the like having a positioning function.

Further, the human-robot interaction record information broadcast in real time to a plurality of robots in a work environment by the server is sent to the server by the plurality of robots in the work environment.

In the embodiments, after the operation that the robot sends the prompt information and waits, at the first location, for the worker to cooperatively complete the task corresponding to the first location, the method further includes the following operation.

The robot sends human-robot interaction record information including human-robot interaction time information and location information corresponding to the first location to the server, to enable the server to broadcast the human-robot interaction record information to other robots.

Further, the operation that the robot sends the human-robot interaction record information including human-robot interaction time information and location information corresponding to the first location to the server includes sending, by the robot, the human-robot interaction record information to the server while the robot and the worker are performing human-robot interaction, and further includes sending, by the robot, the human-robot interaction record information to the server after the robot and the worker complete the execution of human-robot interaction.

For example, in a process that the robot and the worker execute, at the first location, the task corresponding to the first location, the robot sends, to the server, the human-robot interaction record information indicating that human-robot interaction and cooperation are currently being performed at the first location. In addition, after the robot and the worker cooperatively complete the task corresponding to the first location, the robot sends, to the server, the human-robot interaction record information indicating that human-robot interaction is performed at the first location within a time period t from a time point t1 to a time point t2.

Further, in the embodiments, the operation S104 that the robot goes to a next location according to the optimal navigation path of the embodiment shown in FIG. 1 may be implemented according to the following technical means.

The robot determines whether the robot has passed all locations the robot needs to go. For example, the optimal navigation path corresponding to the robot is go to the location P1 to pick the commodity A, then go to the location P2 to pick the commodity B, and finally go to the location P3 to pick the commodity C. In this case, the robot determines whether the robot has passed all locations P1, P2 and P3 the robot needs to go.

In a case of determining that the robot has not passed all locations the robot needs to go, the robot goes to the next location required to go according to the optimal navigation path to execute a task corresponding to the next location. When the corresponding task is executed, whether there is a worker, capable of performing human-robot cooperation, at the next reached location is determined according to operation S102 of the embodiment shown in FIG. 1, and then a corresponding operation is executed according to the determination result.

In a case of determining that the robot has passed all locations the robot needs to go, the robot goes to a preset destination according to the optimal navigation path, and executes, according to a received trigger instruction, an operation event corresponding to the trigger instruction at the preset destination.

For example, in an exemplary application scenario, after the robot has completed the picking tasks at all locations where commodities are to be picked, the robot goes to a preset destination, such as a packaging table, and executes, on the packaging table, the corresponding operation event according to the received trigger instruction. For example, when the robot arrives at the packaging table, an operator can check the currently completed task. The operator can select to package the commodities corresponding to the currently completed task, or to make the robot go to a location, where the task has not been completed, to pick the commodities. In this case, after receiving an operation instruction triggered by the operator, the robot executes the operation event corresponding to the operation instruction in responsive to the operation instruction.

Figure 2:
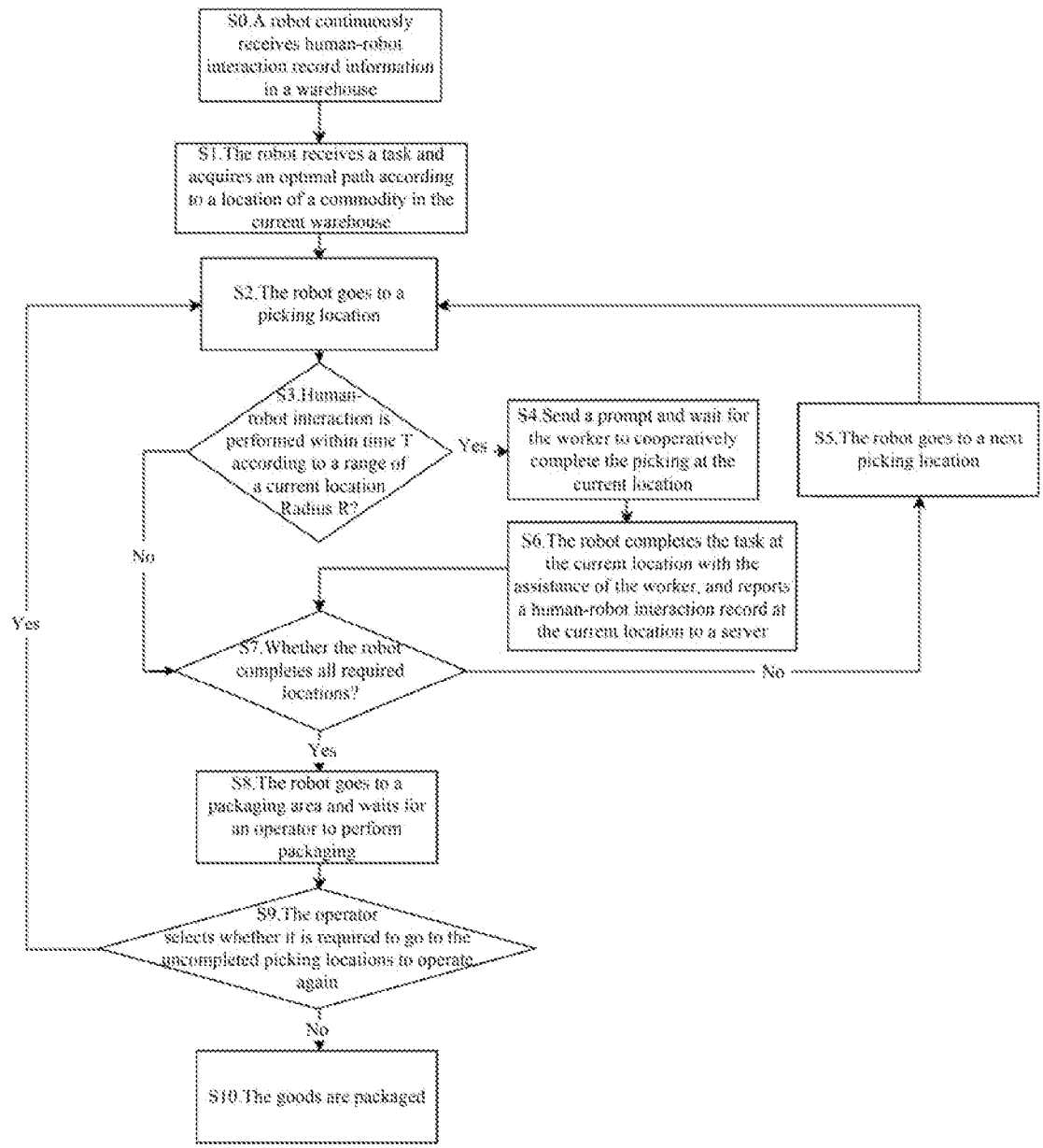
FIG. 2 is a schematic work flowchart of an implementation of a method for shortening a waiting time for human-robot interaction in an exemplary application scenario according to the present disclosure.

In an exemplary application scenario, references is made to FIG. 2, which is a schematic work flowchart of an implementation of a method for shortening a waiting time for human-robot interaction in the specific application scenario according to the present disclosure. In the application scenario shown in FIG. 2, a plurality of robots interact with a warehouse management system and execute orders under the cooperation of a plurality of operation workers; and each of the orders executed by the robots includes a plurality of commodities, and different commodities are located at different locations in the warehouse.

As shown in FIG. 2, the plurality of robots moving in the warehouse continuously receive human-robot interaction record information in the warehouse that is broadcast in real time by the server. Each of the robots receives and acquires a task, and plans an optimal navigation path according to locations of commodities in the current warehouse. For example, if a picking order includes three commodities A, B and C required to be picked, then the optimal navigation path acquired by the robot according to the locations in the current warehouse is to go to the location P1 to pick the commodity A, go to the location P2 to pick the commodity B, and go to the location P3 to pick the commodity C. According to the planned optimal navigation path, the robot goes to the first location to pick the commodity. For example, the robot in the above embodiment goes to the location P1 to pick the commodity.

The robot determines, at the first location, whether there is a worker, capable of performing cooperation, at the first location. The basis of determination is whether a human-robot interaction record exists within time T in the range of a human-robot interaction radius R of the robot. In a case where the human-robot interaction record information exists, it represents that there is a worker capable of performing human-robot cooperation nearby. In a case where the human-robot interaction record information does not exist, it represents that there is no worker capable of performing human-robot cooperation nearby. The robot may continuously receive the human-robot interaction record information that is sent to the server by each robot and broadcast by the server. The human-robot interaction record information includes human-robot interaction occurring at a location X and at time Y. Each robot may receive all the human-robot interaction record information that has occurred in the current warehouse. The human-robot interaction record information can be used as the basis for determining whether there is a worker in a certain location.

When the robot is at the first location, in a case where there is a worker capable of performing cooperation nearby, the robot sends prompt information to give a reminder, and waits, at the current location, for the worker to cooperatively complete the picking task. For example, when the robot is at the location P1 and determines that there is a worker, capable of performing cooperation, in the preset radius range corresponding to the location P1, then the robot waits for the assistance of the worker at the location P1 to complete the picking of the commodity A.

When the robot is at the first location, in a case where there is no worker capable of performing cooperation nearby, the robot goes to a next location. For example, the robot leaves the location P1 and goes to location P2 according to the optimal navigation path.

When the robot completes the picking task at the current location with the assistance of the worker, the robot sends the human-robot interaction record information to the server for reporting to the server that human-robot interaction has occurred at the current location. For example, after the robot completes picking at the location P1, the robot reports, to the server, the human-robot interaction record information indicating that human-robot interaction occurs between the worker and the robot at the location P1 and the time period t, and then the server broadcasts the human-robot interaction record information to other robots in the warehouse, so that the human-robot interaction record information serves as a basis for other robots to determine whether there is a worker at a certain location.

After reporting the human-robot interaction record information corresponding to the human-robot interaction, the robot goes to the next location where a commodity is to be picked. For example, the robot goes to the next location of the to-be-executed task and waits for the assistance of the worker to complete the current task.

After having completed the picking at all the locations where commodities are to be picked, the robot goes to a packaging table. The operator can check the currently completed task, and select to package the commodities corresponding to the currently completed task, or to make the robot go to a location, where the task has not been completed, to pick the commodities. The robot executes the corresponding operation according to the instruction triggered by the operator.

According to the method for shortening a waiting time for human-robot interaction in the embodiments of the present disclosure, a robot acquires a to-be-executed task, plans an optimal navigation path according to a task location of the to-be-executed task, and goes to a first location according to the planned optimal navigation path to execute a task corresponding to the first location. The robot determines whether there is a worker, capable of performing human-robot cooperation, at the first location. In a case where there is a worker, capable of performing human-robot cooperation, at the first location, the robot sends prompt information and waits, at the first location, for the worker to cooperatively complete the task corresponding to the first location. In a case where there is no worker, capable of performing human-robot cooperation, at the first location, the robot goes to a next location according to the optimal navigation path. Therefore, the waiting time of human-robot interaction between the worker and the robot is shortened, and the working efficiency of human-robot interaction is effectively enhanced.

Figure 3:
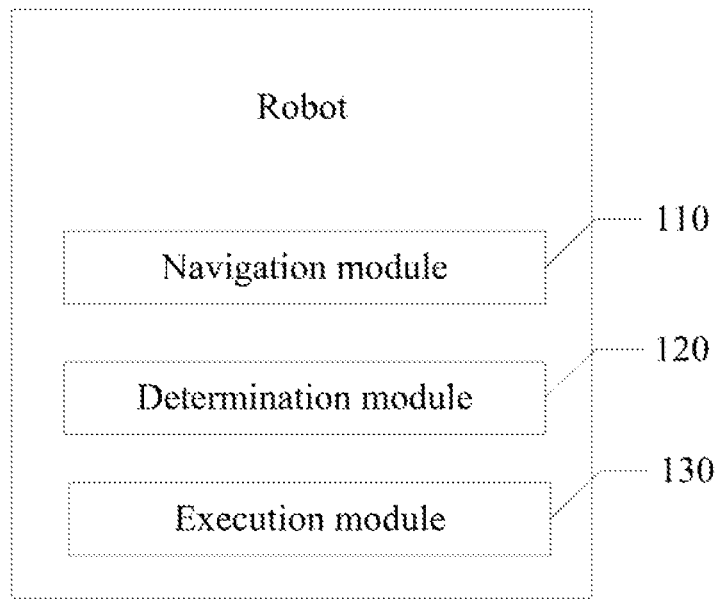
FIG. 3 is a schematic diagram of function modules of an implementation of a robot according to the present disclosure.

Corresponding to the method for shortening a waiting time for human-robot interaction provided in the above embodiment, an embodiment of the present disclosure provides a robot. The robot can execute the method for shortening a waiting time for human-robot interaction provided in the above embodiment. Reference is made to FIG. 3, which is a schematic diagram of function modules of an implementation of a robot according to the present disclosure. The embodiment in FIG. 3 merely functionally describes the robot provided in the embodiment of the present disclosure.

In the embodiment of the present disclosure, the robot functionally includes a navigation module 110, a determination module 120 and an execution module 130.

The navigation module 110 is configured to acquire a to-be-executed task, plan an optimal navigation path according to a task location of the to-be-executed task, and go to a first location according to the planned optimal navigation path to execute a task corresponding to the first location.

The determination module 120 is configured to determine whether there is a worker, capable of performing human-robot cooperation, at the first location.

The execution module 130 is configured to, in a case where there is a worker, capable of performing human-robot cooperation, at the first location, send prompt information and wait, at the first location, for the worker to cooperatively complete the task corresponding to the first location; and in a case where there is no worker, capable of performing human-robot cooperation, at the first location, go to a next location according to the optimal navigation path.

It is to be noted that, the embodiment corresponding to the above robot and the method embodiment belong to the same concept. The specific implementation process refers to the method embodiment. The technical features in the method embodiment are correspondingly applicable to the robot embodiment, and will not be repeated herein.

Figure 4:
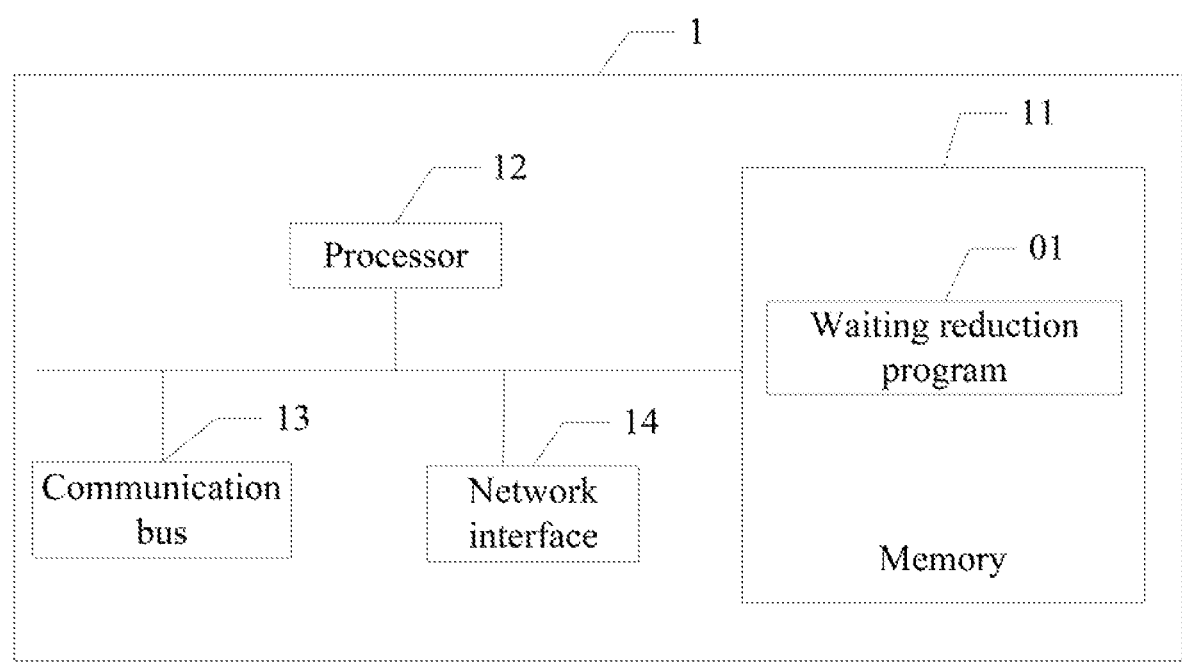
FIG. 4 is a schematic diagram of an internal structure of an implementation of an electronic device according to the present disclosure.

An embodiment of the present disclosure provides an electronic device. According to the electronic device, the purpose of shortening a waiting time for human-robot interaction can be achieved according to the method for shortening a waiting time for human-robot interaction shown in FIG. 1. Reference is made to FIG. 4, which is a schematic diagram of an internal structure of an implementation of an electronic device according to the present disclosure.

In the embodiment, the electronic device 1 may be a Personal Computer (PC), or a terminal device, such as a smart phone, a tablet computer and a portable computer. The electronic device 1 at least includes a memory 11, a processor 12, a communication bus 13 and a network interface 14.

The memory 11 includes at least one type of readable storage medium. The readable storage medium includes a flash memory, a hard disk, a multimedia card, a card-type memory (for example, an SD or DX memory, etc.), a magnetic memory, a magnetic disk, an optical disk, and the like. The memory 11 may be an internal storage unit of the electronic device 1 in some embodiments, such as a hard disk of the electronic device 1. In some other embodiments, the memory 11 may also be an external storage device of the electronic device 1, such as a plug-in hard disk, a Smart Media Card (SMC), and a Secure Digital (SD), a Flash Card, and the like equipped on the electronic device 1. Further, the memory 11 may further include both the internal storage unit of the electronic device 1 and the external storage device. The memory 11 can be configured not only to store application software and various types of data installed in the electronic device 1, such as a code of a waiting reduction program 01, but also to temporarily store data that has been output or will be output.

In some embodiments, the processor 12 may be a Central Processing Unit (CPU), a controller, a microcontroller, a microprocessor or other data processing chips, and is configured to operate a program code or processing data stored in the memory 11, such as execution of the waiting reduction program 01.

The communication bus 13 is configured to achieve connection communication between these assemblies.

In some exemplary implementations, the network interface 14 may include a standard wired interface and a wireless interface (such as a WI-FI interface), and is usually configured to establish a communication connection between the electronic device 1 and other electronic devices.

In some exemplary implementations, the electronic device 1 may also include a user interface. The user interface may include a display and an input unit, such as a keyboard. The optional user interface may also include the standard wired interface and the wireless interface. In some exemplary implementations of some embodiments, the display may be a Light-Emitting Diode (LED) display, a liquid crystal display, a touch liquid crystal display, an OLED touch device, etc. The display can also be appropriately called a display screen or a display unit, and is configured to display the information processed in the electronic device 1 and to display a visualized user interface.

FIG. 4 only shows the electronic device 1 with assemblies 11 to 14 and the waiting reduction program 01. Those having ordinary skill in the art can understand that a structure shown in FIG. 4 does not constitute a limitation on the electronic device 1, and may include fewer or more components than that in the shown figures, or the combination of certain components, or different component arrangements.

Based on the description of the above embodiment, in the embodiment of the electronic device 1 shown in FIG. 4, the memory 11 stores the waiting reduction program 01. The waiting reduction program 01 stored in the memory 11 can be operated on the processor 12. The waiting reduction program 01 implements the following operations when being operated by the processor 12. A robot acquires a to-be-executed task, plans an optimal navigation path according to a task location of the to-be-executed task, and goes to a first location according to the planned optimal navigation path to execute a task corresponding to the first location. The robot determines whether there is a worker, capable of performing human-robot cooperation, at the first location. In a case where there is a worker, capable of performing human-robot cooperation, at the first location, the robot sends prompt information and waits, at the first location, for the worker to cooperatively complete the task corresponding to the first location. In a case where there is no worker, capable of performing human-robot cooperation, at the first location, the robot goes to a next location according to the optimal navigation path.

It is to be noted that, the above device embodiment and the method embodiment belong to the same concept. The specific implementation process refers to the method embodiment. The technical features in the method embodiment are correspondingly applicable to the device embodiment, and will not be repeated herein.

In addition, an embodiment of the present disclosure provides a computer-readable storage medium. The computer-readable storage medium stores a waiting reduction program. The waiting reduction program can be executed by one or more processors to implement the following operations. A robot acquires a to-be-executed task, plans an optimal navigation path according to a task location of the to-be-executed task, and goes to a first location according to the planned optimal navigation path to execute a task corresponding to the first location. The robot determines whether there is a worker, capable of performing human-robot cooperation, at the first location. In a case where there is a worker, capable of performing human-robot cooperation, at the first location, the robot sends prompt information and waits, at the first location, for the worker to cooperatively complete the task corresponding to the first location. In a case where there is no worker, capable of performing human-robot cooperation, at the first location, the robot goes to a next location according to the optimal navigation path.

It is to be noted that, the computer-readable storage medium embodiment in the present disclosure and the method embodiment belong to the same concept. The specific implementation process refers to the method embodiment. The technical features in the method embodiment are correspondingly applicable to the medium embodiment, and will not be repeated herein.

Those having ordinary skill in the art should understand that the embodiments of the present disclosure may be provided as a method, a system, or a computer program product. Therefore, the present disclosure may adopt forms of complete hardware embodiments, complete software embodiments or embodiments integrating software and hardware.

It is apparent that those having ordinary skill in the art can make various modifications and variations to the present disclosure without departing from the spirit and scope of the present disclosure. Thus, if such modifications and variations of the present disclosure fall within the scope of the appended claims and their equivalents, the present disclosure is also intended to cover the modifications and variations.

What is claimed is:

1. A method for shortening a waiting time for human-robot interaction, the method comprising the following operations performed by a robot:
    acquiring a to-be-executed task, planning an optimal navigation path according to a task location of the to-be-executed task, and going to a first location according to the planned optimal navigation path to execute a task corresponding to the first location;
    receiving human-robot interaction record information broadcast by a server in real time; acquiring, according to the human-robot interaction record information, whether a human-robot interaction record exists in a past preset time duration within a preset interaction radius range corresponding to the first location, wherein the human-robot interaction record information comprises record information corresponding to human-robot interaction occurring at a location coordinate (x, y) within a time period T; in a case where the human-robot interaction record exists, determining that there is a worker, capable of performing human-robot cooperation, at the first location; and in a case where the human-robot interaction record does not exist, determining that there is no worker, capable of performing human-robot cooperation, at the first location;
    in a case where there is a worker, capable of performing human-robot cooperation, at the first location, sending prompt information and waiting, at the first location, for the worker to cooperatively complete the task corresponding to the first location; and
    in a case where there is no worker, capable of performing human-robot cooperation, at the first location, going to a next location according to the optimal navigation path.

2. The method for shortening a waiting time for human-robot interaction according to claim 1, wherein determining whether there is a worker, capable of performing human-robot cooperation, at the first location comprises the following operations performed by the robot:
    receiving worker location information broadcast by a server in real time; and
    determining, according to the received worker location information, whether there is a worker, capable of performing human-robot cooperation, within a preset radius range corresponding to the first location, wherein
    the worker performing human-robot cooperation wears a positioning terminal, and the positioning terminal interacts with the server in real time and sends corresponding location information of the worker to the server.

3. The method for shortening a waiting time for human-robot interaction according to claim 2, wherein after sending prompt information and waiting, at the first location, for the worker to cooperatively complete the task corresponding to the first location, the method further comprises the following operation performed by the robot:
    sending human-robot interaction record information comprising human-robot interaction time information and location information corresponding to the first location to the server, to enable the server to broadcast the human-robot interaction record information to other robots.

4. The method for shortening a waiting time for human-robot interaction according to claim 3, wherein sending human-robot interaction record information comprising human-robot interaction time information and location information corresponding to the first location to the server comprises the following operations performed by the robot:
    in a process that the robot and the worker execute, at the first location, the task corresponding to the first location, sending, to the server, the human-robot interaction record information indicating that human-robot cooperation is currently being performed at the first location; and
    after the robot and the worker cooperatively complete the task corresponding to the first location, sending, to the server, the human-robot interaction record information indicating that human-robot interaction is performed at the first location within a time period t from a time point t1 to a time point t2.

5. An electronic device, comprising a memory and a processor, wherein the memory stores a waiting reduction program capable of being operated on the processor, when the waiting reduction program is operated by the processor, the method for shortening a waiting time for human-robot interaction according to claim 4 is executed.

6. An electronic device, comprising a memory and a processor, wherein the memory stores a waiting reduction program capable of being operated on the processor, when the waiting reduction program is operated by the processor, the method for shortening a waiting time for human-robot interaction according to claim 3 is executed.

7. The method for shortening a waiting time for human-robot interaction according to claim 2, wherein going to a next location according to the optimal navigation path comprises the following operations performed by the robot:
    determining whether the robot has passed all locations the robot needs to go;
    in a case of determining that the robot has not passed all locations the robot needs to go, going to the next location required to go according to the optimal navigation path to execute a task corresponding to the next location; and
    in a case of determining that the robot has passed all locations the robot needs to go, going to a preset destination according to the optimal navigation path, and executing, according to a received trigger instruction, an operation event corresponding to trigger instruction at the preset destination.

8. An electronic device, comprising a memory and a processor, wherein the memory stores a waiting reduction program capable of being operated on the processor, when the waiting reduction program is operated by the processor, the method for shortening a waiting time for human-robot interaction according to claim 7 is executed.

9. An electronic device, comprising a memory and a processor, wherein the memory stores a waiting reduction program capable of being operated on the processor, when the waiting reduction program is operated by the processor, the method for shortening a waiting time for human-robot interaction according to claim 2 is executed.

10. A non-transitory computer-readable storage medium, storing a waiting reduction program thereon, wherein the waiting reduction program is executed by one or more processors to implement operations of the method for shortening a waiting time for human-robot interaction according to claim 2.

11. The method for shortening a waiting time for human-robot interaction according to claim 1, wherein after sending prompt information and waiting, at the first location, for the worker to cooperatively complete the task corresponding to the first location, the method further comprises the following operation performed by the robot:

sending human-robot interaction record information comprising human-robot interaction time information and location information corresponding to the first location to the server, to enable the server to broadcast the human-robot interaction record information to other robots.

12. The method for shortening a waiting time for human-robot interaction according to claim 11, wherein sending human-robot interaction record information comprising human-robot interaction time information and location information corresponding to the first location to the server comprises the following operations performed by the robot:

in a process that the robot and the worker execute, at the first location, the task corresponding to the first location, sending, to the server, the human-robot interaction record information indicating that human-robot cooperation is currently being performed at the first location; and after the robot and the worker cooperatively complete the task corresponding to the first location, sending, to the server, the human-robot interaction record information indicating that human-robot interaction is performed at the first location within a time period t from a time point t1 to a time point t2.

13. An electronic device, comprising a memory and a processor, wherein the memory stores a waiting reduction program capable of being operated on the processor, when the waiting reduction program is operated by the processor, the method for shortening a waiting time for human-robot interaction according to claim 12 is executed.

14. An electronic device, comprising a memory and a processor, wherein the memory stores a waiting reduction program capable of being operated on the processor, when the waiting reduction program is operated by the processor, the method for shortening a waiting time for human-robot interaction according to claim 11 is executed.

15. A non-transitory computer-readable storage medium, storing a waiting reduction program thereon, wherein the waiting reduction program is executed by one or more processors to implement operations of the method for shortening a waiting time for human-robot interaction according to claim 11.

16. The method for shortening a waiting time for human-robot interaction according to claim 1, wherein going to a next location according to the optimal navigation path comprises the following operations performed by the robot:

determining whether the robot has passed all locations the robot needs to go;

in a case of determining that the robot has not passed all locations the robot needs to go, going to the next location required to go according to the optimal navigation path to execute a task corresponding to the next location; and in a case of determining that the robot has passed all locations the robot needs to go, going to a preset destination according to the optimal navigation path, and executing, according to a received trigger instruction, an operation event corresponding to trigger instruction at the preset destination.

17. An electronic device, comprising a memory and a processor, wherein the memory stores a waiting reduction program capable of being operated on the processor, when the waiting reduction program is operated by the processor, the method for shortening a waiting time for human-robot interaction according to claim 16 is executed.

18. An electronic device, comprising a memory and a processor, wherein the memory stores a waiting reduction program capable of being operated on the processor, when the waiting reduction program is operated by the processor, the method for shortening a waiting time for human-robot interaction according to claim 1 is executed.

19. A non-transitory computer-readable storage medium, storing a waiting reduction program thereon, wherein the waiting reduction program is executed by one or more processors to implement operations of the method for shortening a waiting time for human-robot interaction according to claim 1.

20. A robot, comprising:

a navigation module, configured to acquire a to-be-executed task, plan an optimal navigation path according to a task location of the to-be-executed task, and go to a first location according to the planned optimal navigation path to execute a task corresponding to the first location;

a determination module, configured to receive human-robot interaction record information broadcast by a server in real time; acquire, according to the human-robot interaction record information, whether a human-robot interaction record exists in a past preset time duration within a preset interaction radius range corresponding to the first location, wherein the human-robot interaction record information comprises record information corresponding to human-robot interaction occurring at a location coordinate (x, y) within a time period T; in a case where the human-robot interaction record exists, determine that there is a worker, capable of performing human-robot cooperation, at the first location; and in a case where the human-robot interaction record does not exist, determine that there is no worker, capable of performing human-robot cooperation, at the first location; and an execution module, configured to:

in a case where there is a worker, capable of performing human-robot cooperation, at the first location, send prompt information and wait, at the first location, for the worker to cooperatively complete the task corresponding to the first location; and in a case where there is no worker, capable of performing human-robot cooperation, at the first location, go to a next location according to the optimal navigation path.

* * * * *